United States Patent
Twigg

(10) Patent No.: US 7,316,066 B2
(45) Date of Patent: Jan. 8, 2008

(54) METHOD OF MANUFACTURING AN ARTICLE BY APPLYING HEAT AND PRESSURE, A METHOD OF CONNECTING A PIPE TO A SEALED ASSEMBLY AND A CONNECTOR FOR USE THEREIN

(75) Inventor: Edwin S Twigg, Derby (GB)

(73) Assignee: Rolls-Royce plc, London (GB)

( * ) Notice: Subject to any disclaimer, the term of this patent is extended or adjusted under 35 U.S.C. 154(b) by 169 days.

(21) Appl. No.: 10/988,591

(22) Filed: Nov. 16, 2004

(65) Prior Publication Data

US 2005/0104368 A1 May 19, 2005

(30) Foreign Application Priority Data

Nov. 18, 2003 (GB) ................... 0327043.6

(51) Int. Cl.
*B21D 53/78* (2006.01)
*B23P 11/00* (2006.01)

(52) U.S. Cl. ................... 29/889.71; 29/525.14

(58) Field of Classification Search ........... 29/889.71, 29/889.7, 889.2, 525.14, 428; 285/21.1; 228/193

See application file for complete search history.

(56) References Cited

U.S. PATENT DOCUMENTS

| 4,406,393 | A | | 9/1983 | Ascani |
| 5,284,288 | A | | 2/1994 | Woodward |
| 5,366,138 | A | | 11/1994 | Vela |
| 5,470,524 | A | | 11/1995 | Krueger |
| 5,544,805 | A | | 8/1996 | Alassoeur |
| 5,946,801 | A | * | 9/1999 | Twigg et al. ............ 29/889.71 |
| 2001/0022023 | A1 | * | 9/2001 | Wallis ..................... 29/889.72 |
| 2003/0029904 | A1 | | 2/2003 | Pursell |

FOREIGN PATENT DOCUMENTS

| EP | 0 535 935 A | 4/1993 |
| EP | 0 831 154 A | 3/1998 |
| EP | 0 908 263 A | 4/1999 |
| EP | 0908263 A | 4/1999 |
| EP | 1188497 A | 3/2002 |

* cited by examiner

*Primary Examiner*—John C. Hong
(74) *Attorney, Agent, or Firm*—W. Warren Taltavull; Manelli Denison & Selter PLLC

(57) ABSTRACT

A method of manufacturing an article by diffusion bonding at least two metal components (30,36) comprises assembling the metal components (30,36) into a stack relative to each other so that the surfaces (34,40) are in mating contact. The edges of the metal components (30,36) are sealed together, except for an aperture (49) where a pipe (50) is to be connected. A connector (51) has a first end (52) and a second end (53). The first end (52) has a smaller diameter than the second end (53) and a bore (54) extends through the connector (51) from the first end (52) to the second end (53). The second end (53) of the connector (51) is joined (57) to the stack. The pipe (50) is joined (58) to the first end (52) of the connector (51). The interior of the sealed assembly is evacuated via the pipe (50) and the pipe is sealed. Heat and pressure are applied to diffusion bond the metal components (30,36) together to form an integral structure. The connector (51) reduces the possibility of failure of the pipe (50) and/or seal (57) during diffusion bonding.

34 Claims, 3 Drawing Sheets

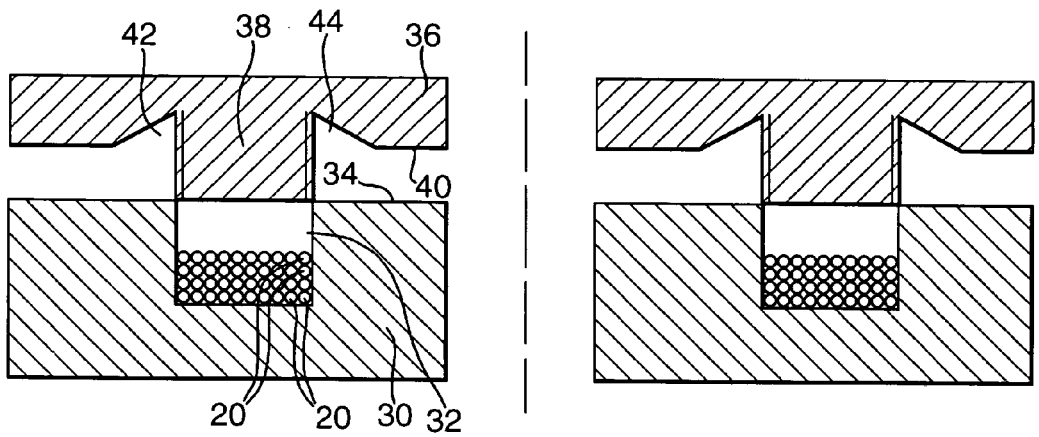
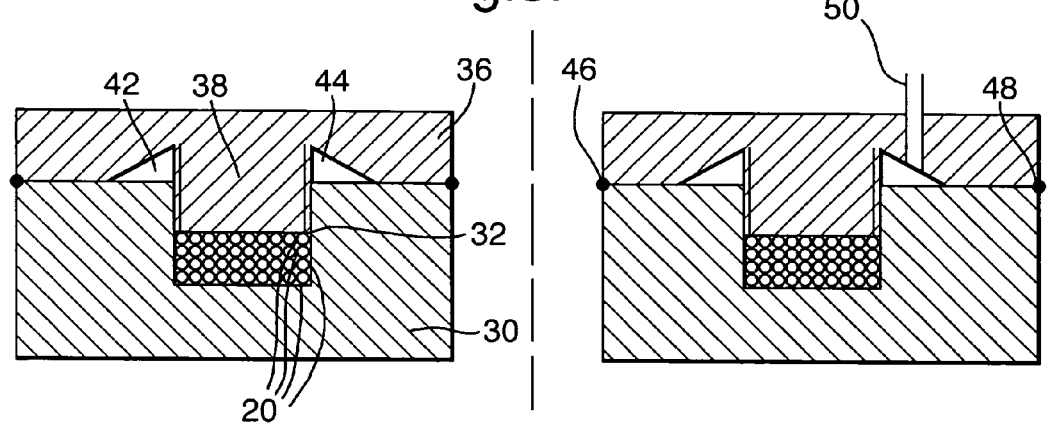
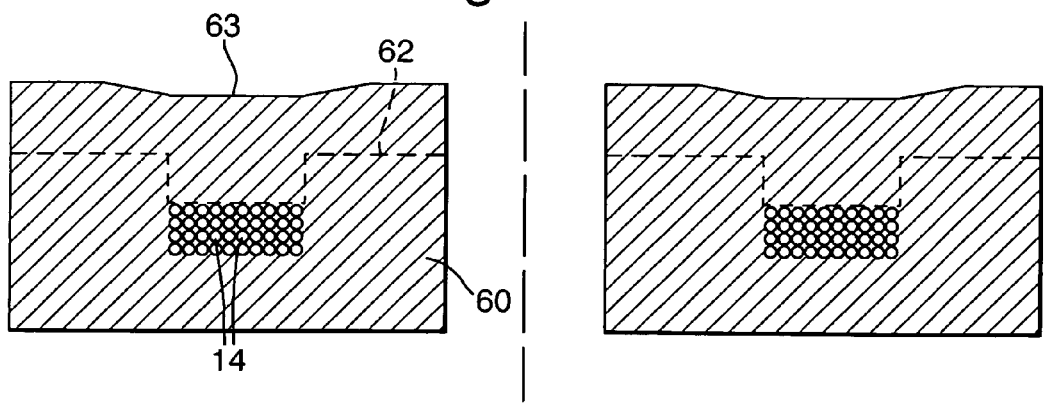

METHOD OF MANUFACTURING AN ARTICLE BY APPLYING HEAT AND PRESSURE, A METHOD OF CONNECTING A PIPE TO A SEALED ASSEMBLY AND A CONNECTOR FOR USE THEREIN

TITLE OF THE INVENTION

1. Field of the Invention

The present invention relates to a method of manufacturing an article by applying heat and pressure. The present invention relates to a method of manufacturing of article using a sealed assembly, which has been evacuated by a pipe connected at a rigid point of attachment. The present invention relates to a method of manufacturing a fibre reinforced metal matrix composite article, and the present invention relates in particular to a method of manufacturing a fibre reinforced metal matrix composite rotor, for example fibre reinforced metal matrix rings and fibre reinforced metal matrix composite discs. The present invention relates particularly to fibre reinforced metal matrix composite discs and fibre reinforced metal matrix composite rings which are suitable for use in gas turbine engines as blade carrying compressor, or turbine, rotors.

2. Background of the Invention

In one known method of manufacturing a fibre reinforced metal matrix composite article, as disclosed in European patent No. EP0831154B1, a plurality of metal-coated fibres are placed in an annular groove in a metal ring and a metal ring is placed on top of the metal-coated fibres. Each of the metal-coated fibres is wound in a plane and the metal-coated fibre spirals are stacked in the annular groove in the metal ring. The metal ring is pressed predominantly axially to consolidate the assembly and to diffusion bond the metal rings and the metal-coated fibre spirals together to form an integral structure.

In a further known method of manufacturing a fibre reinforced metal matrix composite article, as disclosed in European patent application No. EP1288324A2, the arrangement described in EP0831154B1 is modified by the inclusion of metal wires in the annular groove in the metal ring with the metal-coated fibres. Each of the metal wires is wound spirally in a plane and the metal wire spirals are stacked in the annular groove in the metal ring with the metal-coated fibre spirals.

In these methods of manufacturing a fibre reinforced metal matrix composite the assembly of metal rings and metal-coated fibre spirals, or metal-coated fibre spirals and metal wire spirals, is sealed at the periphery and junction of the metal rings to form a sealed assembly prior to the diffusion bonding and consolidation process. The sealed assembly is evacuated via at least one pipe and the at least one pipe is sealed before the diffusion bonding and consolidation process.

In these known methods of diffusion bonding and consolidation it is essential that there is a vacuum in the sealed assembly in order to ensure that a satisfactory diffusion bond is formed between the metal rings and that the vacuum is maintained in the sealed assembly when they are subsequently heated and pressed together during the diffusion bonding process.

However, there is a problem using this process because the heat and pressure applied during the diffusion bonding process causes the at least one pipe to collapse/move whereas the metal rings are relatively large and rigid and do not/cannot move at the point of attachment of the at least one pipe. This collapsing/movement of the at least one pipe relative to the metal rings may result in a failure/bursting of the at least one pipe or a failure at the point of attachment of the at least one pipe to the metal rings. The point of attachment of the at least one pipe to the metal rings usually comprises a weld seal and the weld seal may fail during the diffusion bonding process. The failure of the at least one pipe or failure of the weld seal results in a loss of vacuum in the sealed assembly and hence a failure to diffusion bond and consolidate the sealed assembly. This may result in the scrapping of the metal rings and/or metal-coated fibre spirals, which may be high value sub-components.

European patent No. EP0908263B1 discloses a method of manufacturing an article by diffusion bonding in which a pipe is angled relative to an aperture in a sealed assembly to reduce the possibility of failure of the pipe during diffusion bonding.

However, even this arrangement does not fully solve the problem because it is still possible for the pipe to move at its point of attachment, the weld, to the sealed assembly.

Accordingly the present invention seeks to provide a novel method of manufacturing an article by diffusion bonding.

SUMMARY OF THE INVENTION

Accordingly the present invention provides a method of manufacturing an article by applying heat and pressure comprising the steps of:—

(a) joining a connector to a sealed assembly, the connector having a first end and a second end, the first end having a smaller cross-sectional area than the second end and a bore extending through the connector from the first end to the second end, joining the second end of the connector to the sealed assembly,
(b) joining a pipe to the first end of the connector,
(c) evacuating the interior of the sealed assembly via the pipe,
(d) sealing the pipe with at least one seal,
(e) applying heat and pressure to the sealed assembly.

Step (a) may comprise assembling at least two metal components into a stack relative to each other so that the surfaces are in mating contact, sealing the edges of the at least two metal components together, except for an aperture where a pipe is to be connected, to form the sealed assembly and step (e) comprises applying heat and pressure to diffusion bond the at least two metal components together to form an integral structure.

Preferably step (a) comprises forming a first metal component, forming a second metal component, forming at least one fibre preform, the fibre preform comprising at least one fibre, placing the at least one fibre and a filler metal between the first metal component and the second metal component, sealing the first metal component to the second metal component and step (e) comprises applying heat and pressure such as to consolidate the at least one fibre and the filler metal and to diffusion bond the filler metal, the first metal component and the second metal component to form a unitary composite component.

Preferably step (a) comprises forming a groove in the first metal component, placing the at least one fibre and filler metal in the groove in the first metal component and placing the second metal component in the groove of the first metal component.

Preferably step (a) comprises forming a projection on the second metal component and placing the projection of the second metal component in the groove in the first metal component.

Preferably step (a) comprises forming a circumferentially extending groove in a face of the first metal component, placing at least one circumferentially extending fibre and the filler metal in the circumferentially extending groove of the first metal component and placing the second metal component in the groove of the first metal component.

Preferably the at least one fibre is a silicon carbide fibre, a silicon nitride fibre, a boron fibre or an alumina fibre.

Preferably the fibre is a metal-coated fibre.

Preferably the metal-coated fibre is titanium coated fibre, a titanium aluminide coated fibre or a titanium alloy coated fibre.

Preferably the circumferentially extending fibre is a fibre preform.

Preferably the fibre preform is formed by winding at least one fibre on a former to form a spiral fibre preform.

Preferably the filler metal comprises at least one metal wire.

Preferably the metal wire is a wire preform.

Preferably the wire preform is formed by winding at least one metal wire on a former to form a spiral wire preform.

Preferably the at least one metal wire is a titanium wire, a titanium aluminide wire or a titanium alloy wire.

The first end of the connector may have a larger cross-sectional area bore portion to receive the outer surface of the pipe.

Alternatively the first end of the connector receives the inner surface of the pipe.

Preferably the connector tapers from the first end to the second end. Preferably the connector tapers smoothly from the first end to the second end.

Preferably the connector is circular in cross-section.

Preferably the pipe is circular in cross-section.

Preferably the second end of the connector has a smaller cross-sectional area portion than the remainder of the second end and the smaller cross-sectional area portion extends into the aperture in the sealed assembly.

Preferably the connector comprises a material softer than the at least two metal components.

Preferably the sealing of the edges of the at least two metal components may be by welding the edges of the at least two metal components together.

Preferably the second end of the connector is joined to the sealed assembly by welding.

Preferably the pipe is joined to the first end of the connector by welding.

The present invention also provides a connector to connect a pipe to a sealed assembly, the connector comprising a first end and a second end, the first end having a smaller cross-sectional area than the second end, a bore extending through the connector from the first end to the second end, the first end having means to receive the pipe and the second end having means to be received on the sealed assembly.

The first end of the connector may have a larger cross-sectional area bore portion to receive the outer surface of the pipe.

Alternatively the first end of the connector receives the inner surface of the pipe.

Preferably the connector tapers from the first end to the second end.

Preferably the connector tapers smoothly from the first end to the second end.

Preferably the connector is circular in cross-section.

Preferably the bore is circular in cross-section.

Preferably the second end of the connector has a smaller cross-sectional area portion and the smaller cross-sectional area portion extends into the aperture in the sealed assembly.

Preferably the connector comprises a material softer than the sealed assembly.

The present invention also provides a method of connecting a pipe to a sealed assembly, comprising joining a connector to a sealed assembly, the connector having a first end and a second end, the first end having a smaller cross-sectional area than the second end and a bore extending through the connector from the first end to the second end, joining the second end of the connector to the sealed assembly, joining a pipe to the first end of the connector.

The first end of the connector may have a larger cross-sectional area bore portion to receive the outer surface of the pipe.

The first end of the connector may receive the inner surface of the pipe.

Preferably the connector tapers from the first end to the second end.

Preferably the connector tapers smoothly from the first end to the second end.

Preferably the connector is circular in cross-section. Preferably the bore is circular in cross-section.

Preferably the second end of the connector has a smaller cross-sectional area portion and the smaller cross-sectional area portion extends into the aperture in the sealed assembly.

Preferably the connector comprises a material softer than the sealed assembly.

BRIEF DESCRIPTION OF THE DRAWINGS

The present invention will be more fully described by way of example with reference to the accompanying drawings, in which:—

FIG. 4 is a longitudinal, axial, cross-sectional view through an assembly of fibre preforms positioned between first and second metal rings.

FIG. 5 is a longitudinal, axial, cross-sectional view through the assembly of fibre preforms positioned between first and second metal rings after welding together.

FIG. 8 is a longitudinal, axial, cross-sectional view through the assembly of fibre preforms positioned between first and second metal rings after consolidation and bonding to form a unitary composite article.

DETAILED DESCRIPTION OF THE INVENTION

Figure 1:
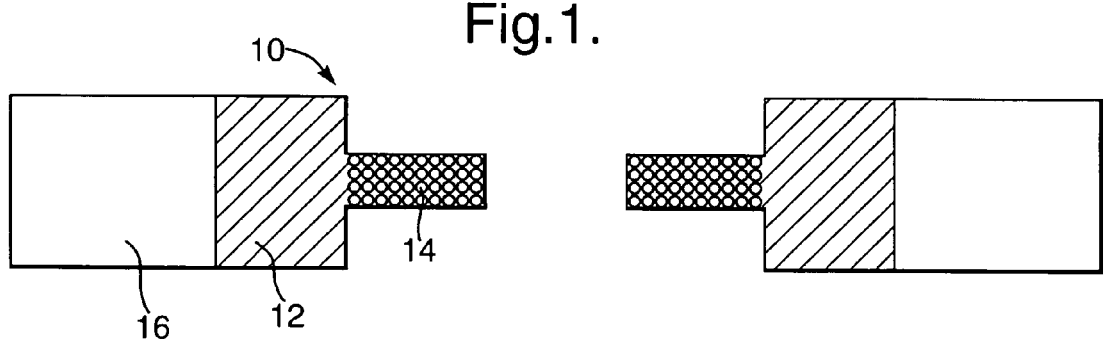
FIG. 1 is a longitudinal, axial, cross-sectional view through a bladed compressor rotor made according to the present invention.

A finished ceramic fibre reinforced metal rotor 10 with integral rotor blades is shown in FIG. 1. The rotor 10 comprises a metal ring 12, which includes a ring of circumferentially extending reinforcing ceramic fibres 14, which are embedded in the metal ring 12. A plurality of solid metal rotor blades 16 are circumferentially spaced on the metal ring 12 and extend radially outwardly from and are integral with the metal ring 12.

Figure 2:
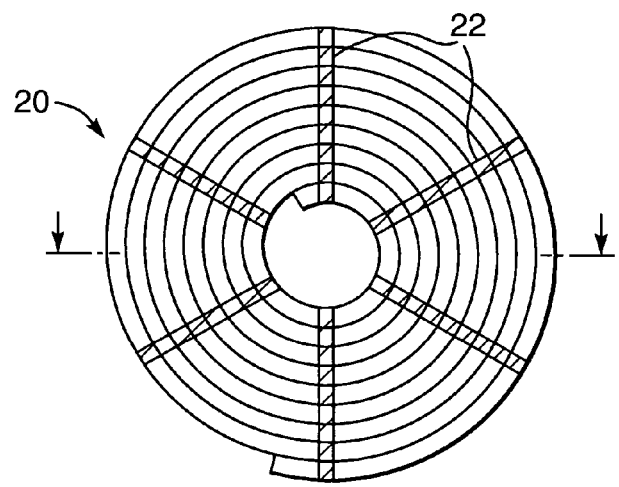
FIG. 2 is a plan view of a fibre preform used in the method of the present invention.
Figure 3:
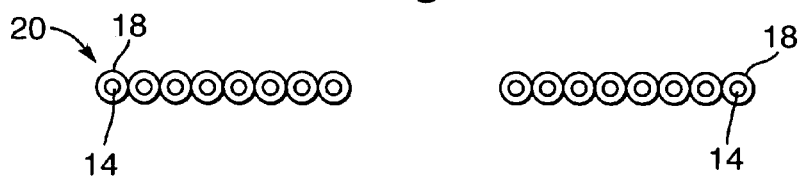
FIG. 3 is a cross-sectional view through the preform shown in FIG. 2.

A ceramic fibre reinforced metal rotor 10 is manufactured using a plurality of metal-coated ceramic fibres. Each ceramic fibre 14 is coated with metal matrix 18 by any suitable method, for example physical vapour deposition, sputtering etc. Each metal-coated 18 ceramic fibre 14 is wound around a mandrel to form an annular, or disc shaped, fibre preform 20 as shown in FIGS. 2 and 3. Each annular, or disc shaped, fibre preform 20 thus comprises a single metal-coated ceramic fibre 14 arranged in a spiral with adjacent turns of the spiral abutting each other. A glue 22 is applied to the annular, or disc shaped, fibre preform 20 at suitable positions to hold the turns of the spiral together. The glue is selected such that it may be completely removed from the annular, or disc shaped, fibre preform 20 prior to consolidation. The glue may be for example polymethylmethacrylate in dichloromethane (Perspex (RTM) in dichloromethane).

A first metal ring, or metal disc, 30 is formed and an annular axially extending groove 32 is machined in one radially extending axially facing face 34 of the first metal ring 30, as shown in FIG. 4. The annular groove 32 has straight parallel sides, which form a rectangular cross-section. A second metal ring, or metal disc, 36 is formed and an annular axially extending projection 38 is machined from the second metal ring, or metal disc, 36 such that it extends from one radially extending axially facing face 40 of the second metal ring, or metal disc 36. The second metal ring, or metal disc, 36 is also machined to form two annular grooves 42 and 44 in the face 40 of the second metal ring, or metal disc, 36. The annular grooves 42 and 44 are arranged radially on opposite sides of the annular projection 38 and the annular grooves 42 and 44 are tapered radially from the face 40 to the base of the annular projection 38. It is to be noted that the radially inner and outer dimensions, diameters, of the annular projection 38 are substantially the same as the radially inner and outer dimensions, diameters, of the annular groove 32.

One or more of the annular fibre preforms 20 are positioned coaxially in the annular groove 32 in the face 34 of the first metal ring 30. The radially inner and outer dimensions, diameters, of the annular fibre preforms 20 are substantially the same as the radially inner and outer dimensions, diameters, of the annular groove 32 to allow the annular fibre preforms 20 to be loaded into the annular groove 32 while substantially filling the annular groove 32. A sufficient number of annular fibre preforms 20 are stacked in the annular groove 32 to partially fill the annular groove 32 to a predetermined level.

The second metal ring 36 is then arranged such that the face 40 confronts the face 34 of the first metal ring 30 and the axes of the first and second metal rings 30 and 36 are aligned such that the annular projection 38 on the second metal ring 36 aligns with the annular groove 32 in the first metal ring 30. The second metal ring 36 is then pushed towards the first metal ring 30 such that the annular projection 38 enters the annular groove 32 and is further pushed until the face 40 of the second metal ring 36 abuts the face 34 of the first metal ring 30, as shown in FIG. 5.

The radially inner and outer peripheries of the face 34 of the first metal ring 30 are sealed to the radially inner and outer peripheries of the face 40 of the second metal ring 36 to form a sealed assembly. The sealing is preferably by TIG welding, electron beam welding, laser welding or other suitable welding processes to form an inner annular weld seal 46 and an outer annular weld seal 48 as shown in FIG. 5.

Figure 6:
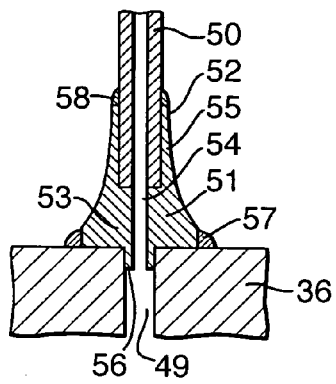
FIG. 6 is an enlarged cross-sectional view of a connector and pipe shown in FIG. 5.

A pipe 50 is then connected to an aperture 49 in the sealed assembly via a connector 51, as shown more clearly in FIG. 6. The connector 51 comprises a first end 52 and a second end 53, the first end 52 has a smaller cross-sectional area than the second end 53 and a bore 54 extends through the connector 51 from the first end 52 to the second end 53.

The first end 52 of the connector 51 has a larger cross-sectional area bore portion 55. The cross-sectional area of the bore portion 55 is substantially the same as the cross-sectional area of the pipe 50 such that the outer surface of the pipe 50 may be received in the bore portion 55. The connector 51 tapers from the first end 52 to the second end 53 and preferably the connector 51 tapers smoothly from the first end 52 to the second end 53. The connector 51 is circular in cross-section, the bore 54 is circular in cross-section and the pipe 50 is circular in cross-section. The second end 53 of the connector 51 has a smaller cross-sectional area portion 56. The smaller cross-sectional area portion 56 has substantially the same cross-sectional area as the aperture 49 such that the smaller cross-sectional portion 56 may be inserted into the aperture 49 in the sealed assembly to accurately locate the connector 51 relative to the first and second metal rings 30 and 36. The connector 51 comprises a material softer than the first and second metal rings 30 and 36.

The portion 56 is inserted into the aperture 49 and the outer surface of the second end 53 of the connector 51 is sealed to the sealed assembly, second metal ring 36, by a weld 57. The pipe 50 is inserted into the bore portion 55 and the outer surface of the pipe 50 is sealed to the first end 52 of the connector 51 by a weld 58. The welds 57 and 58 are preferably TIG welds.

The sealed assembly is evacuated using a vacuum pump and the pipe 50 connected to the grooves, or chambers, 42 and 44. The sealed assembly is then heated, while being continuously evacuated to remove the glue 22 from the annular fibre preforms 20 and to remove the glue 22 from the sealed assembly.

After all the glue 22 has been removed from the annular fibre preforms 20 and the interior of the sealed assembly is evacuated, the pipe 50 is sealed at one or more positions using resistance welds. The sealed assembly is then heated and pressure is applied to the sealed assembly to produce axial consolidation of the annular fibre preforms 20 and diffusion bonding of the first metal ring 30 to the second metal ring 36 and diffusion bonding of the metal on the metal-coated 18 ceramic fibres 14 to the metal on other metal-coated 18 ceramic fibres 14, to the first metal ring 30 and to the second metal ring 36. During the application of heat and pressure the pressure acts equally from all directions on the sealed assembly, and this causes the annular projection 38 to move axially into the annular groove 32 to consolidate the annular fibre preforms 20.

The resulting consolidated and diffusion bonded ceramic fibre reinforced component is shown in FIG. 8, which shows the ceramic fibres 14 and the diffusion bond region 62. Additionally the provision of the annular grooves, or chambers, 42 and 44 allows the annular projection 38 to move during the consolidation process and in so doing this results in the formation of a recess 63 in the surface of what was the second metal ring 36. The recess 63 indicates that successful consolidation has occurred.

After consolidation and diffusion bonding the article is machined to remove at least a portion of what was originally the first metal ring 30, at least a portion of the second metal ring 36 and at least a portion of the diffusion bonded region 62. In the example the majority of the second metal ring 36 and the majority of the diffusion-bonded region 62 is removed.

The article may then be machined for example by electrochemical machining or milling to form the integral compressor blades 16, as shown in FIG. 1, or the article may be machined to form one or more slots to receive the roots of the compressor blades.

Alternatively, compressor blades may be friction welded, laser welded or electron beam welded onto the article.

The advantage of the present invention is that during the diffusion bonding and consolidation, e.g. hot isostatic pressing, the connector 51 progressively collapses but the seal, weld 57, between the connector 51 and the sealed assembly does not fail and the seal, weld 58, between the connector 51 and the pipe 50 does not fail. The welds 57 and 58 do not fail because the connector 51 tapers from the first end 52 to the second end 53. The connector 51 is also made of a softer material. The connector 51 tapers gradually from the relatively rigid sealed assembly to the collapsible pipe 50, thus the second end 53 of the connector 51 is relatively rigid to match the sealed assembly and the first end 52 of the connector 51 is collapsible to match the pipe 50. Thus the welds 57 and 58 are primarily vacuum seals, and need not be structural welds e.g. the welds 57 and 58 may be TIG welds rather than electron beam welds.

Figure 7:
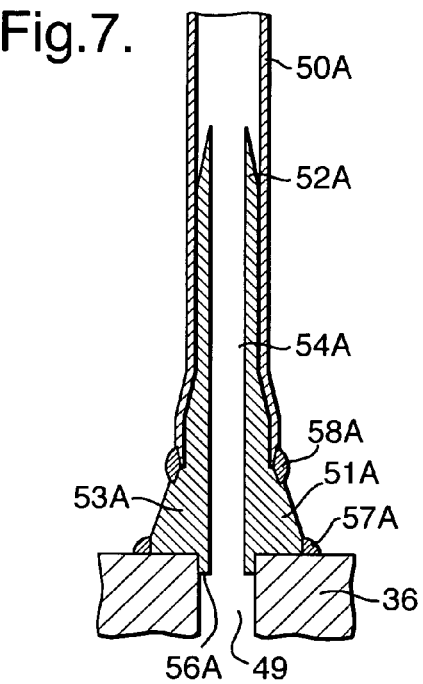
FIG. 7 is an enlarged cross-sectional view of an alternative connector and pipe shown in FIG. 5.

An alternative connector 51A, as shown in FIG. 7, comprises a first end 52A and a second end 53A, the first end 52A has a smaller cross-sectional area than the second end 53A and a bore 54A extends through the connector 51A from the first end 52A to the second end 53A.

The first end 52A of the connector 51A receives the inner surface of the pipe 50A. The cross-sectional area of the first end 52A of the connector 51A is substantially the same as the cross-sectional area of the inner surface of the pipe 50A. The connector 51A tapers from the first end 52A to the second end 53A and preferably the connector 51A tapers smoothly from the first end 52A to the second end 53A. The connector 51A is circular in cross-section, the bore 54A is circular in cross-section and the pipe 50A is circular in cross-section. The second end 53A of the connector 51A has a smaller cross-sectional area portion 56A. The smaller cross-sectional area portion 56A has substantially the same cross-sectional area as the aperture 49A such that the smaller cross-sectional portion 56A may be inserted into the aperture 49A in the sealed assembly to accurately locate the connector 51 relative to the first and second metal rings 30 and 36. The connector 51A comprises a material softer than the first and second metal rings 30 and 36.

The portion 56A is inserted into the aperture 49 and the outer surface of the second end 53A of the connector 51A is sealed to the sealed assembly, second metal ring 36, by a weld 57A. The inner surface of the pipe 50A is forced over the outer surface of the first end 52A and the outer surface of the pipe 50 is sealed to the connector 51 by a weld 58A. The welds 57A and 58A are preferably TIG welds.

Before diffusion bonding and consolidation the assembly is sealed at one or more positions by resistance welds. The connector 51A is sealed by a resistance weld radially through the pipe 50A and through the first end 52A of the connector 51A and this forms the primary vacuum seal. The pipe 50A is sealed by one or more resistance welds to provide additional vacuum seals. The seal through the connector 51A minimises the risk of vacuum failure due to failure of the thin walled large diameter pipe 50A, it is to be noted that large diameter pipe 50A has to be thin walled to enable it to collapse during diffusion bonding/consolidation.

The connector 51A has the same advantages as the connector 51 and in addition the connector 51A provides better sealing of the pipe 50A.

The connector 51 is generally used for small diameter pipes e.g. 3 mm bore and 1.5 mm thick wall pipes and the connector 51A is generally used for larger diameter thin walled pipes.

The reinforcing fibres may comprise alumina, silicon carbide, silicon nitride, boron or other suitable fibre.

The metal coating on the reinforcing fibre may comprise titanium, titanium aluminide, titanium alloy, aluminium, aluminium alloy, copper, copper alloy or any other suitable metal, alloy or intermetallic which is capable of being diffusion bonded.

The first metal ring and the second metal ring comprise titanium, titanium aluminide, titanium alloy, aluminium, aluminium alloy, copper, copper alloy or any other suitable metal, alloy or intermetallic which is capable of being diffusion bonded.

Figure 9:
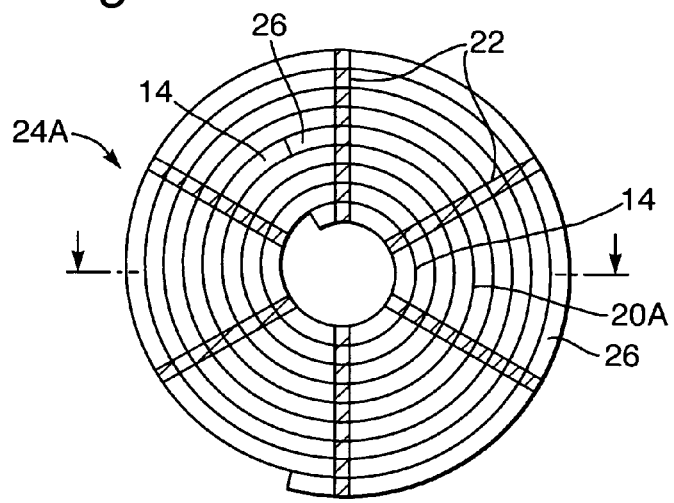
FIG. 9 is a plan view of a fibre and wire preform used in an alternative method of the present invention.
Figure 10:
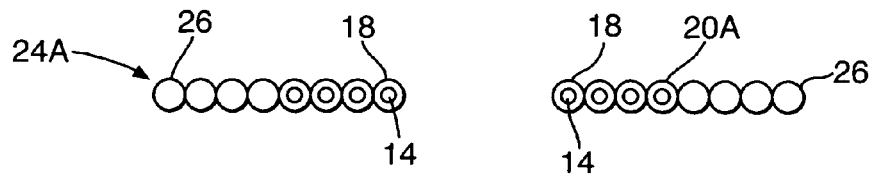
FIG. 10 is a cross-sectional view through the preform shown in FIG. 9.

Although the present invention has been described with reference to spirally wound metal coated fibres alone, the present invention is also applicable to the use of fibre preforms 20A comprising spirally wound metal-coated 18 ceramic fibres 14 and wire preforms 24A comprising spirally wound metal wires 26, as shown in FIGS. 9 and 10. In FIGS. 9 and 10 each fibre preform 20A is arranged in the same plane as an associated wire preform 24A, but each wire preform 24A is at a greater diameter. The preforms 20A and 24A may be arranged in different planes.

Additionally the present invention is applicable to the use of spirally wound fibres and metal foils, spirally wound fibres and metal powder, helically wound fibres in metal ribbon, spirally wound fibres and spirally wound metal wires or other form of metal filler.

The metal wire may comprise titanium, titanium aluminide, titanium alloy, aluminium, aluminium alloy, copper, copper alloy or any other suitable metal, alloy or intermetallic which is capable of being diffusion bonded. The metal foil, metal ribbon, metal powder or other metal filler may comprise titanium, titanium aluminide, titanium alloy, aluminium, aluminium alloy, copper, copper alloy or any other suitable metal, alloy or intermetallic which is capable of being diffusion bonded.

In the example of titanium alloy metal rings, e.g. Ti 6 wt % Al 4 wt % V, the connectors may comprise commercially pure titanium, which is softer than the titanium alloy.

Although the present invention has been described with reference to providing a circumferentially extending groove in a face of a first metal ring and a circumferentially extending projection on a face of a second metal ring it is equally applicable to the provision of a circumferentially extending groove on a radially outer or inner face of a ring. The present invention is also applicable to the use of a plurality of fibres, or metal-coated fibres, extending in a single direction with the fibres, or metal-coated fibres, being arranged in layers and with the layers being stacked upon each other.

The present invention is also applicable to any other arrangement where the fibres are placed between two or more metal components.

Although the present invention has been described with reference to the manufacture of fibre reinforced metal matrix composite articles, the present invention is also applicable to other manufacturing processes in which heat and pressure are applied to sealed assemblies, which have been evacuated by a pipe connected at a rigid point of attachment. Thus the present invention is also applicable to other manufacturing processes which use diffusion bonding for example the manufacture of diffusion bonded articles, the manufacture of diffusion bonded and superplastically formed articles or the manufacture of hot isostatically pressed articles e.g. for the consolidation of powder metal articles. The connector may be used to connect a pipe to a collapsible vacuum bag in which metal components, metal powder etc are placed to be diffusion bonded, brazed, consolidated, hot isostatically pressed etc. The pipe is connected to the vacuum bag at a rigid point of attachment.

I claim:

1. A method of manufacturing an article by applying heat and pressure comprising the steps of:
   (a) joining a connector to a sealed assembly, the connector having a first end and a second end, the first end having a smaller cross-sectional area than the second end and a bore extending through the connector from the first end to the second end, joining the second end of the connector to the sealed assembly,
   (b) joining a pipe to the first end of the connector,
   (c) evacuating the interior of the sealed assembly via the pipe,
   (d) sealing the pipe with at least one seal,
   (e) applying heat and pressure to the sealed assembly,
   wherein step (a) comprises forming a first metal component, forming a second metal component, forming at least one fibre preform, the fibre preform comprising at least one fibre, placing the at least one fibre and a filler metal between the first metal component and the second metal component, sealing the first metal component to the second metal component and step (e) comprises applying heat and pressure such as to consolidate the at least one fibre and the filler metal and to diffusion bond the filler metal, the first metal component and the second metal component to form a unitary composite component.

2. A method as claimed in claim 1 wherein step (a) comprises assembling at least two metal components into a stack relative to each other so that the surfaces are in mating contact, sealing the edges of the at least two metal components together, except for an aperture where a pipe is to be connected, to form the sealed assembly and step (e) comprises applying heat and pressure to diffusion bond the at least two metal components together to form an integral structure.

3. A method as claimed in claim 1 wherein step (a) comprises forming a groove in the first metal component, placing the at least one fibre and the filler metal in the groove in the first metal component and placing the second metal component in the groove of the first metal component.

4. A method as claimed in claim 3 wherein step (a) comprises forming a projection on the second metal component and placing the projection of the second metal component in the groove in the first metal component.

5. A method as claimed in claim 3 wherein step (a) comprises forming a circumferentially extending groove in a face of the first metal component, placing at least one circumferentially extending fibre and the filler metal in the circumferentially extending groove of the first metal component and placing the second metal component in the groove of the first metal component.

6. A method as claimed in claim 3 wherein the at least one fibre is selected from the group comprising a silicon nitride fibre, a silicon carbide fibre, a boron fibre and an alumina fibre.

7. A method as claimed in claim 3 wherein the fibre is a metal coated fibre.

8. A method as claimed in claim 7 wherein the metal-coated fibre is selected from the group comprising titanium coated fibre, a titanium aluminide coated fibre and a titanium alloy coated fibre.

9. A method as claimed in claim 8 wherein the circumferentially extending fibre is a fibre preform.

10. A method as claimed in claim 9 wherein the fibre preform is formed by winding at least one fibre on a former to form a spiral fibre preform.

11. A method as claimed in claim 3 wherein the filler metal comprises at least one metal wire.

12. A method as claimed in claim 11 wherein the metal wire is a wire preform.

13. A method as claimed in claim 12 wherein the wire preform is formed by winding at least one metal wire on a former to form a spiral wire preform.

14. A method as claimed in claim 12 wherein the at least one metal wire is selected from the group comprising a titanium wire, a titanium aluminide wire and a titanium alloy wire.

15. A method as claimed in claim 1 wherein the first end of the connector has a larger cross-sectional area bore portion to receive the outer surface of the pipe.

16. A method as claimed in claim 1 wherein the connector tapers from the first end to the second end.

17. A method as claimed in claim 16 wherein the connector tapers smoothly from the first end to the second end.

18. A method as claimed in claim 1 wherein the pipe is circular in cross-section.

19. A method as claimed in claim 1 wherein the sealing of the edges of the at least two metal components is by welding the edges of the at least two metal components together.

20. A method as claimed in claim 1 wherein the second end of the connector is joined to the sealed assembly by welding.

21. A method as claimed in claim 1 wherein the pipe is joined to the first end of the connector by welding.

22. A method of manufacturing an article by applying heat and pressure comprising the steps of:
   (a) joining a connector to a sealed assembly, the connector having a first end and a second end, the first end having a smaller cross-sectional area than the second end and a bore extending through the connector from the first end to the second end, joining the second end of the connector to the sealed assembly,
   (b) joining a pipe to the first end of the connector,
   (c) evacuating the interior of the sealed assembly via the pipe,
   (d) sealing the pipe with at least one seal,
   (e) applying heat and pressure to the sealed assembly, wherein the first end of the connector receives the inner surface of the pipe.

23. A method of manufacturing an article by applying heat and pressure comprising the steps of:
   (a) joining a connector to a sealed assembly, the connector having a first end and a second end, the first end having a smaller cross-sectional area than the second end and a bore extending through the connector from the first end to the second end, joining the second end of the connector to the sealed assembly,
   (b) joining a pipe to the first end of the connector,
   (c) evacuating the interior of the sealed assembly via the pipe,
   (d) sealing the pipe with at least one seal, (e) applying heat and pressure to the sealed assembly, wherein the connector is circular in cross-section.

24. A method of manufacturing an article by applying heat and pressure comprising the steps of:
(a) joining a connector to a sealed assembly, the connector having a first end and a second end, the first end having a smaller cross-sectional area than the second end and a bore extending through the connector from the first end to the second end, joining the second end of the connector to the sealed assembly,
(b) joining a pipe to the first end of the connector,
(c) evacuating the interior of the sealed assembly via the pipe,
(d) sealing the pipe with at least one seal,
(e) applying heat and pressure to the sealed assembly, wherein the bore is circular in cross-section.

25. A method of manufacturing an article by applying heat and pressure comprising the steps of:
(a) joining a connector to a sealed assembly, the connector having a first end and a second end, the first end having a smaller cross-sectional area than the second end and a bore extending through the connector from the first end to the second end, joining the second end of the connector to the sealed assembly,
(b) joining a pipe to the first end of the connector,
(c) evacuating the interior of the sealed assembly via the pipe,
(d) sealing the pipe with at least one seal,
(e) applying heat and pressure to the sealed assembly, wherein the second end of the connector has a smaller cross-sectional area portion than the remainder of the second end and the smaller cross-sectional area portion extends into the aperture in the sealed assembly.

26. A method of manufacturing an article by applying heat and pressure comprising the steps of:
(a) joining a connector to a sealed assembly, the connector having a first end and a second end, the first end having a smaller cross-sectional area than the second end and a bore extending through the connector from the first end to the second end, joining the second end of the connector to the sealed assembly,
(b) joining a pipe to the first end of the connector,
(c) evacuating the interior of the sealed assembly via the pipe,
(d) sealing the pipe with at least one seal,
(e) applying heat and pressure to the sealed assembly, wherein step (a) comprises assembling at least two metal components into a stack relative to each other so that the surfaces are in mating contact, sealing the edges of the at least two metal components together, except for an aperture where a pipe is to be connected, to form the sealed assembly and step (e) comprises applying heat and pressure to diffusion bond the at least two metal components together to form an integral structure, wherein the connector comprises a material softer than the at least two metal components.

27. A method of connecting a pipe to a sealed assembly, comprising joining a connector to a sealed assembly, the connector having a first end and a second end, the first end having a smaller cross-sectional area than the second end and a bore extending through the connector from the first end to the second end, joining the second end of the connector to the sealed assembly, joining a pipe to the first end of the connector wherein the first end of the connector receives the inner surface of the pipe.

28. A method as claimed in claim 27 wherein the first end of the connector has a larger cross-sectional area bore portion to receive the outer surface of the pipe.

29. A method as claimed in claim 27 wherein the connector tapers from the first end to the second end.

30. A method as claimed in claim 29 wherein the connector tapers smoothly from the first end to the second end.

31. A method as claimed in claim 27 wherein the connector is circular in cross-section.

32. A method of connecting a pipe to a sealed assembly, comprising joining a connector to a sealed assembly, the connector having a first end and a second end, the first end having a smaller cross-sectional area than the second end and a bore extending through the connector from the first end to the second end, joining the second end of the connector to the sealed assembly, joining a pipe to the first end of the connector wherein the bore is circular in cross-section.

33. A method of connecting a pipe to a sealed assembly, comprising joining a connector to a sealed assembly, the connector having a first end and a second end, the first end having a smaller cross-sectional area than the second end and a bore extending through the connector from the first end to the second end, joining the second end of the connector to the sealed assembly, joining a pipe to the first end of the connector wherein the second end of the connector has a smaller cross-sectional area portion and the smaller cross-sectional area portion extends into the aperture in the sealed assembly.

34. A method of connecting a pipe to a sealed assembly, comprising joining a connector to a sealed assembly, the connector having a first end and a second end, the first end having a smaller cross-sectional area than the second end and a bore extending through the connector from the first end to the second end, joining the second end of the connector to the sealed assembly, joining a pipe to the first end of the connector wherein the connector comprises a material softer than the metal sealed assembly.

* * * * *